UNITED STATES PATENT OFFICE.

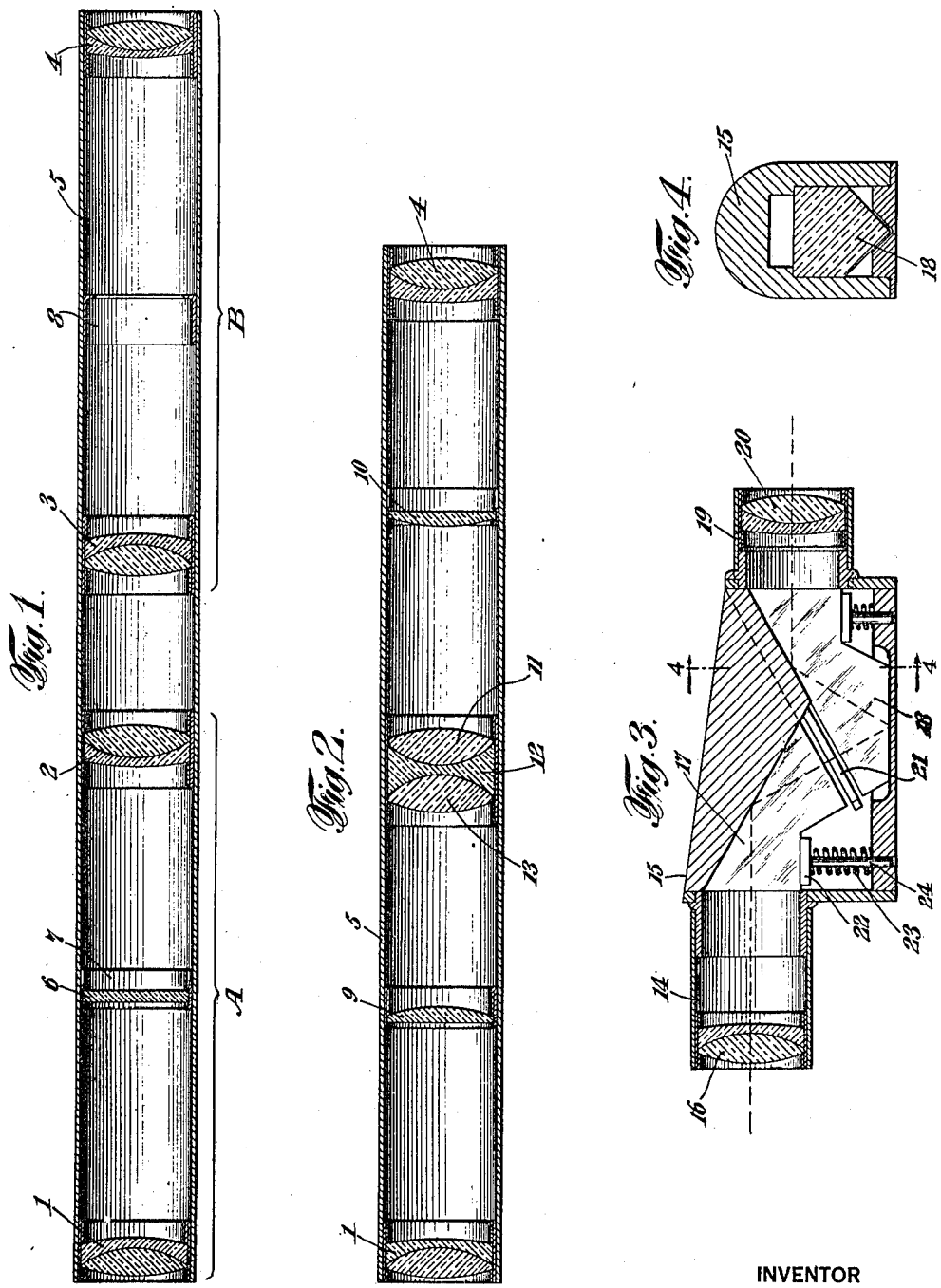

HENRI CHRÉTIEN, OF NICE, FRANCE.

COLLIMATING DEVICE AND METHOD OF SIGHTING.

1,311,846.  Specification of Letters Patent.  Patented July 29, 1919.

Application filed May 1, 1919. Serial No. 294,077.

*To all whom it may concern:*

Be it known that I, HENRI CHRÉTIEN, a citizen of France, and a resident of Nice, France, (whose post-office address is Observatory at Nice, (A. M.,) France,) have invented certain new and useful Improvements in Collimating Devices and Methods of Sighting, of which the following is a specification.

My invention relates to a collimating device and may be used in connection with rifles, machine guns, and for other similar purposes.

It has been recognized for a long time that the method of aiming at a target by means of a system of front and rear sights is a very unsatisfactory one. This method, without any theoretical necessity obliges the shooter to place his eye in a sharply determined position and to keep it constantly so while bringing the line of sight in the direction of the target. In such a system it is necessary for the shooter to aline four points before he is ready to fire, namely, the eye, the rear sight, the front sight, and the target. Furthermore, on account of the differences in distance between the eye and the target, the eye and the front sight, and the eye and the rear sight, respectively, the sight of accommodation of the eye is very unsteady, and this results in very rapid visual fatigue. The ultimate consequence of all these difficulties is to delay and confuse the act of firing.

It has heretofore been sought to overcome these difficulties, and several attempts have been made to that end but none of such attempts has been successful in eliminating all the difficulties encountered in what appears to be such a simple operation, but which, in fact, is a very complicated one.

It has been attempted heretofore to solve the problem by using a small telescope, but this has proven to be unsatisfactory in many respects. The use of a magnifying instrument, such as the telescopes heretofore used, was probably with a view to increasing the accuracy of sight. This, however, is fallacious and combined with the well known physiological fact that the faculty of accommodation of the eye is lacking when viewing under such conditions, and therefore, necessitates the individual focusing of the instrument. The supposed increase in accuracy by the magnifying power is thus illusory and while aiding and overcoming some of the difficulties, produces others which are equally objectionable, as for instance, the magnification exaggerates the motions of the gun as shown by the apparent motion of the target, which somewhat bewilders the observer. It also reduces proportionally both the field view and the diameter of the exit pupil of the instrument in which the pupil of the observer's eye is to be placed. Therefore, a more careful adjustment of the position of the eye is necessary, which reduces the promptness of firing.

One of the objects of my invention is to give the most complete solution of all these physiological problems of sight which present themselves when aiming at a very rapidly moving target, possibly an enemy. My invention is most completely illustrated in its application to the fight of one aeroplane with another.

The invention consists of an optical device which projects a known optical index or emblem over the image of the target without substantially impairing the image of the target either in regard to position, size or luminosity. By this means the observer is enabled to sight in the most natural manner. He may look with both eyes open directly at the target itself, looking far away into a wide field of view and with a large tolerance for the position of the eye, having nothing to focus upon but the target.

By using the collimator embodying my invention, the shooter keeps the full control of all his physiological powers, is able to judge evolutions of the enemy and to fire with maximum promptness because of the unit magnifying power of the instrument.

My invention may be carried out in numerous ways involving various forms of devices. The accompanying drawings illustrate the invention in three preferred forms. In the drawings—

Figure 1 represents one form, namely of a rectilinear clear collimator (long type).

Fig. 2 represents another form, namely of a rectilinear clear collimator (short type).

Fig. 3 represents a third form, namely, a clear collimator (catadioptric type); and Fig. 4 is a section along line 4—4 of Fig. 3.

Referring to Fig. 1, the instrument there shown is composed of two optical systems A and B, preferably identical, although not necessarily so. These two systems are mounted symmetrically in succession, the system B being intended for erecting the image transmitted by the first system, it being understood that the system A is the front system of the device. The magnifying power of the systems A and B is not necessarily equal to unity, it being necessary only that the magnifying power of the complete system, including systems A and B, be equal to unity. It is, however, my preference for practical reasons and convenience, that the component parts of the system, that is to say, the systems A and B, shall be identical.

Each of the systems A and B is composed of two achromatic lenses having the same power. The system A has the lenses 1 and 2, and the system B has the lenses 3 and 4, all of said lenses being placed in a casing 5. Placed in the focal plane of the lens 1 is a surface 6, upon which is engraved or otherwise applied the pattern or emblem of known configuration, which is to be projected on the target. This pattern or emblem may consist of a cross-wire stretched across the field, or any other suitable emblem. When a more complicated pattern is desired, such a pattern may be engraved on the surface 6 which is arranged in the focal plane of the lens 1. The lenses 3 and 4 are suitably placed with respect to the lenses 1 and 2, and between the lenses 3 and 4 is placed a diaphragm 8 having an opening therein of the desired size. The lens 1 gives a real but inverted image of the target, which image is located in the focal plane 6. The lens 2 is placed in such a position that its front focal plane coincides with the plane of the pattern or emblem. The lens 2 transmits the image of the target as well as the emblem, but that image is also inverted and cannot, therefore, be used for the purpose intended. The second telescopic system, that is the system B, is provided for the sole purpose of erecting the preceding image transmitted by the system A. That is to say, the image comes in through lens 1 and is shown on lens 2 in an inverted position. It is then transmitted by the lens 3 and shown on the lens 4 in an upright position, that is the same position as it came in through the lens 1. In other words, there are means between the lenses 1 and 4 for erecting the image.

The curvature of the surfaces of the lenses is such as to remove both the chromatic and the spherical aberration for a point at infinity. By proper choice of the glasses, the astigmatism and the curvature of field can be reduced to an acceptable minimum.

From the theoretical standpoint of geometrical optics, the adoption of a unit magnification and of a symmetrical disposition of the lenses has many advantages. The aberrations known as coma and distortion are automatically compensated for and a very wide field of view can be obtained with a very big aperture, that is with a very large exit pupil.

The distance between the systems A and B depends upon the length available for the whole instrument.

When the space available for an instrument, such as that shown in Fig. 1, is such that it is necessary to reduce its length to such an extent that the field would be undesirably reduced, this may be overcome by the device shown in Fig. 2, which, aside from its length, is the same as the device of Fig. 1, with the exception that in place of the plane 6, a field lens 9 is inserted, said lens 9 bearing upon its plain surface the known pattern or emblem. The device of Fig. 2 also has placed therein between the lenses corresponding to the lenses 3 and 4, a field lens 10 instead of the diaphragm 8, as in Fig. 1.

It will be noted also that in Fig. 2 the two internal lenses corresponding to the lenses 2 and 3 of Fig. 1 have been combined into one lens composed of three parts, 11, 12 and 13. By a suitable choice of the kind of glass, that is, with a rather low ratio of their dispersive powers, the triplet composed of the parts 11, 12 and 13 may be rendered symmetrical, achromatic and corrected for spherical aberration for conjugate points situated in its anti-principal planes 9 and 10. The operation of the device of Fig. 2 is identical with that of Fig. 1, the field glasses being inserted in order to permit of the shortening of the instrument without reducing its field undesirably.

In order to further reduce the length of the instrument while maintaining a proper field of view, I have devised the arrangement shown in Figs. 3 and 4. In this device only one telescopic system is used, the means for erecting the image consisting of a system of reflecting prisms. The device of Fig. 3 has some advantages over the other arrangements, among which are that it is very short in length and because the body of the instrument is almost invisible to the shooter when his eye is in the firing position. The device of Fig. 3 consists of a cylindrical section of casing 14 which may be screwed into or otherwise attached to the body 15 of the instrument. Placed in the casing 14 is a lens 16 of the same construction as that of lens 1. Placed in the casing 15 is a total reflecting prism 17. Placed in the casing 15 is also a second prism 18 which is a combined prism consisting of a combination of an Amici prism (or roof prism) and a totally reflecting ordinary prism. The erecting of the image is produced by the reflection of the light on the surfaces meeting along the edge E—E', called the roof, which is a well known property of the Amici prism. Secured onto the casing 15 is a casing 19 carrying a lens 20 of the same general construction as that of the lens 4 (Figs. 1 and 2). Located between the prisms 17 and 18 is a plane 21 upon which is engraved or otherwise placed the known image or emblem. The lenses 16 and 20 are so placed that their focal planes are superposed upon the plane 21 between the two prisms 17 and 18, which, as above stated, carries the known emblem or pattern.

The prism 17 is held in place by means of a member 22 which has a coil spring 23 around a stem 24 attached thereto, which engages the lower part of the prism and presses the same upward against the member 15. The prism 18 is held in place against the casing 15 by a similar device.

The means of fastening the various lenses, &c., in the casings in the various forms of the device shown may be of any well known character and do not form a part of my invention.

The mounting of the optical pieces above mentioned permits of their adjustment so that the magnifying power of the complete device is unity for an eye accommodated to infinity even in the case where the two focal planes are not exactly equal. The diaphragms are not indispensable and one of them may receive a polarizing apparatus (analyzer) designed to augment the visibility of objects when their observation is interfered with by foreign polarized light.

The lines of the known emblem may be coated or have otherwise applied thereto active phosphorescent products by means of radio active substances which permit employing the collimator during the night.

Many changes in detail may be made in the carrying out of the principle of my invention, and I therefore, desire to state that I am not to be limited to the exact details shown and described as the same have been used merely for the purpose of illustrating the principle of my invention.

Having described my invention, what I claim as new and desire to secure by Letters Patent is:

1. The combination of an ordnance piece with a sighting device therefor comprising a casing, a lens system having magnifying power of unity and including a known emblem in said casing, and means for erecting the image transmitted through the first member of said system.

2. In a sighting device for ordnance the combination of a lens, a surface bearing a known emblem and located in the focal plane of said lens, and means for erecting the image and transmitting the image and emblem to the eye, said device having unity magnifying power.

3. In a sighting device for ordnance the combination of a casing, two sets of achromatic lenses, the whole having a magnifying power of unity, in said casing, and a member bearing known emblem located in the focal plane of one set of said lenses.

4. In a sighting device for ordnance the combination of a casing, a pair of achromatic lenses in said casing, a member between said lenses bearing a known emblem and means between said lenses for erecting the image transmitted by the first of said lenses said device having unity magnifying power.

5. In a collimating device for sighting with ordnance, the combination of a casing, a pair of lenses therein for projecting an inverted image of a target, a known emblem in the focal plane of the first of said pair of lenses and a second pair of lenses for transmitting the said image of said target and said emblem to the eye of the observer and erecting the image of said target, said device having unity magnifying power.

6. In a collimating device for sighting with ordnance, the combination of a casing, a pair of lenses therein for projecting an inverted image of a target, a field lens between said pair of lenses and in the focal plane of one of said lenses, a second pair of lenses for inverting said image and a field lens in the focal plane of one of said second pair of lenses, said device having unity magnifying power.

7. In a collimating device for sighting with ordnance, the combination of a casing, a pair of lenses therein for projecting an inverted image of a target, a field lens bearing a known emblem and located between said pair of lenses and in the focal plane of one of said lenses, a second pair of lenses for inverting said image and a field lens in the focal plane of one of said second pair of lenses, said device having unity magnifying power.

8. The method of sighting, which consists in transmitting the image of the target with a known emblem projected on said image through a system of lenses of unity magnifying power and erecting said image of the target.

In testimony whereof I have signed my name to this specification.

HENRI CHRÉTIEN.